United States Patent [19]
Kanazawa

[11] Patent Number: 5,873,280
[45] Date of Patent: Feb. 23, 1999

[54] MODULE WIPER DEVICE

[75] Inventor: Keisuke Kanazawa, Shizuoka-ken, Japan

[73] Assignee: Asmo Co., Ltd., Shizuoka-ken, Japan

[21] Appl. No.: 747,331

[22] Filed: Nov. 12, 1996

[30] Foreign Application Priority Data

Dec. 26, 1995 [JP] Japan ................................ 7-351840

[51] Int. Cl.⁶ ................................................ F16H 21/16
[52] U.S. Cl. .............................................. 74/42; 15/250.3
[58] Field of Search .......................... 15/250.3, 250.31, 15/250.27; 74/42, 43

[56] References Cited

U.S. PATENT DOCUMENTS

| | | | |
|---|---|---|---|
| 2,357,152 | 8/1944 | Whitted | 15/250.27 X |
| 5,222,706 | 6/1993 | Hoshino | 74/42 X |
| 5,261,286 | 11/1993 | Hayashi | 74/42 X |
| 5,271,120 | 12/1993 | Eustashe et al. | |
| 5,396,681 | 3/1995 | Hara | |

FOREIGN PATENT DOCUMENTS

| | | | |
|---|---|---|---|
| 359733 | 3/1990 | European Pat. Off. | 15/250.3 |
| 1368673 | 6/1964 | France | 15/250.27 |
| 2640211 | 6/1990 | France | 15/250.31 |
| 2228188 | 8/1990 | United Kingdom | 15/250.27 |
| 2 258 146 | 3/1993 | United Kingdom | |

*Primary Examiner*—Charles A. Marmor
*Assistant Examiner*—Scott Lund
*Attorney, Agent, or Firm*—Marshall A. Lerner, Esq.; Bradford E. Mattes, Esq.; Kleinberg & Lerner, LLP

[57] ABSTRACT

A module wiper device having a sufficient strength even in a small-size structure and having a lightweight and low-cost structure is provided. Even when a plurality of pivot holders are connected by a frame and a small-size bracket is fixed close to one of the pivot holders, by the bracket and the pivot holder close to the bracket being connected by a connecting member, a space portion surrounded by the bracket, the pivot holder close to the bracket and the connecting member forms a virtual bracket.

20 Claims, 7 Drawing Sheets

MODULE WIPER DEVICE

BACKGROUND OF THE INVENTION

1. Field of the Invention

The present invention relates to a module wiper device incorporated into a vehicle together with a wiper motor, a link mechanism, and the like, which are integrated with the module wiper device.

2. Description of the Related Art

Conventionally, there has been known a module wiper device which has a wiper motor, a link mechanism, and the like integrated therewith, to facilitate incorporation of the module wiper device into a vehicle body. The wiper device of this kind has an advantage in that not only it can be easily incorporated into the vehicle, but also the strength of the wiper device itself can be improved because the wiper device has an integrated structure using a bracket, and therefore, it has been frequently used recently.

However, since a bracket used in the module wiper device is integrally molded by aluminum die casting, the bracket entirely becomes larger and increases in weight. Further, there is a drawback in that a mold of a die casting machine for forming the bracket also becomes large and expensive.

Accordingly, as shown in FIG. 7, there has been proposed a structure in which pivot holders 1a, 1b are connected by a pipe frame 2, a small-size bracket 4 is fixed to an intermediate portion of the pipe frame 2, and a wiper motor 3 is fixed to and supported by the bracket 4, with the result that the bracket itself is made smaller, lightweight and inexpensive (for example, see Japanese Utility Model Application Laid-Open (JP-U) No. 1-171767).

With the above structure, when the small-size bracket 4 is fixed to and supported by the pipe frame 2 at a position substantially equally distant from the pivot holders 1a, 1b (L1=L2), the distance between the bracket 4 and each of the pivot holders 1a, 1b is relatively long. For this reason, the pipe frame 2 can bend and stress can be absorbed by the bending of the pipe frame 2 to a certain degree, even if reaction force of an unillustrated wiper blade wiping is transmitted to the wiper motor 3, the small-size bracket 4 and the pipe frame 2 via link rods 5, 6. On the other hand, when the small-size bracket 4 is fixed close to one pivot holder 1a owing to unavoidable circumstances in that an arrangement space within an engine room is small, the distance between the small-size bracket 4 and the pivot holder 1a closer thereto than the other becomes short, so that an amount by which the pipe frame 2 can bend decreases. As a result, stress concentrates in a portion of the pipe frame 2 between the pivot holder 1a and the bracket 4 so that a crack may be formed in the pipe frame 2 or the pivot holder 1a.

In order to solve the above-described problem, conventionally, there has existed a structure shown in FIG. 8. Namely, among pivot holders 1a, 1b fixed to a vehicle body, one pivot holder 1b is connected via the pipe frame 2 to the bracket 10, the bracket 10 is fixed to the vehicle body, another pivot holder 1a and the wiper motor 3 are fixed to and supported by the bracket 10, with the result that the strength of the pipe frame is compensated for by using a relatively large bracket 10 including the pivot holder 1a without using a short pipe frame and the rigidity of the module wiper device is thereby improved.

However, although the above structure shows an improvement in size, cost and weight as compared with the die casting bracket, the bracket 10 becomes relatively large depending upon a position where it is mounted to the frame 2. Accordingly, even in this case, the bracket 10 increases in cost and in weight and there still remains need for improvement.

SUMMARY OF THE INVENTION

In view of the above-described circumstances, it is an object of the present invention to provide a module wiper device in which, even when a plurality of pivot holders are connected by a frame and a small-size bracket is fixed close to one of the pivot holders, sufficient strength of a frame can be maintained, and which has a lightweight and low-cost structure.

In order to achieve the above-described object, there is provided a module wiper device comprising: a plurality of pivot holders fixed to a vehicle body and rotatably supporting pivot shafts to which wiper arms are fixed; a frame for connecting the pivot holders; a bracket fixed at an intermediate portion of the frame in such a manner as to be close to one of the pivot holders; a wiper motor fixed to the bracket; a link rod portion which connects a swinging lever fixed to at least one pivot shaft to the wiper motor, converts rotating movement of the wiper motor into reciprocating movement, and transmits the reciprocating movement to the swinging lever; and a connecting member for connecting the bracket and the pivot holder close to the bracket to each other, wherein a space portion formed by the frame, the bracket, the connecting member, and the pivot holder close to the bracket forms a virtual bracket.

With the above-described structure, the connecting member can be formed integrally with one of the bracket and the pivot holder closer to the bracket, or both of them.

In particular, even when the plurality of pivot holders are connected by the frame and the small-size bracket is fixed close to one of the pivot holders, the bracket and the pivot holder close to the bracket are connected to each other by the connecting member so that the space portion formed by the pivot holder close to the bracket, the bracket, the connecting member and the frame forms a virtual bracket. As a result, it is possible to maintain the strength of the same level as that in the case in which a large-size bracket including a pivot holder is used. In addition, since the bracket itself is of a small size, a lightweight and low-cost structure can be obtained.

Further, when the connecting member is formed integrally with one of the pivot holder close to the bracket and the bracket, or both of them, the shape of the pivot holder or the bracket is partially changed to form the connecting member without the connecting member being formed as a separate body, so that the connecting member is a parts integrated with the pivot holder or with the bracket. Accordingly, assembling efficiency can be improved and the number of parts can be reduced, with the result that the wiper device having a lower-cost structure can be obtained.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Figure 1:
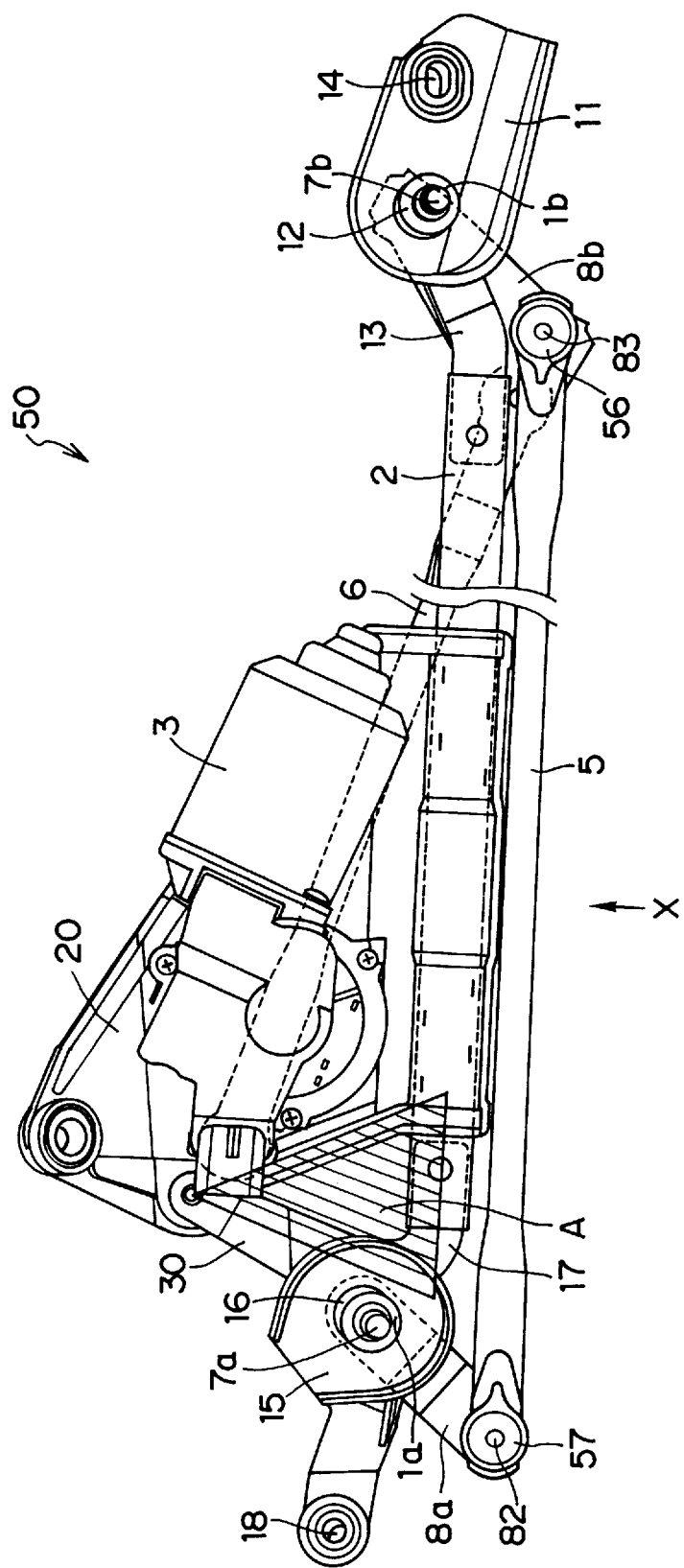
FIG. 1 is an overall structural view of a module wiper device according to a first embodiment to which the present invention is applied.
Figure 2:
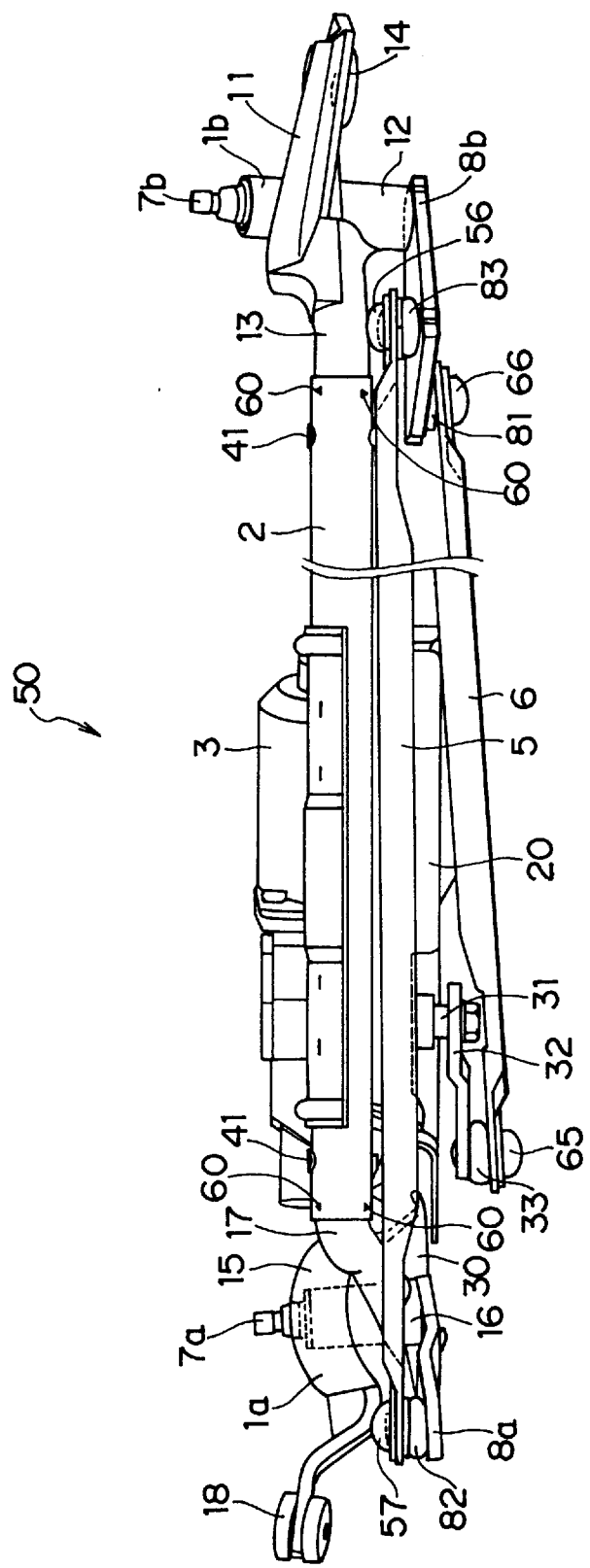
FIG. 2 is a view when seen from the direction indicated by arrow X in FIG. 1.

Referring now to the attached drawings, embodiments of the present invention will be described hereinafter. It should be noted that the same members as those of the conventional structure will be denoted by the same reference numerals.

[First Embodiment]

A first embodiment of the present invention will be described with reference to FIGS. 1, 2, 3, 4, 5 and 9.

Figure 9:
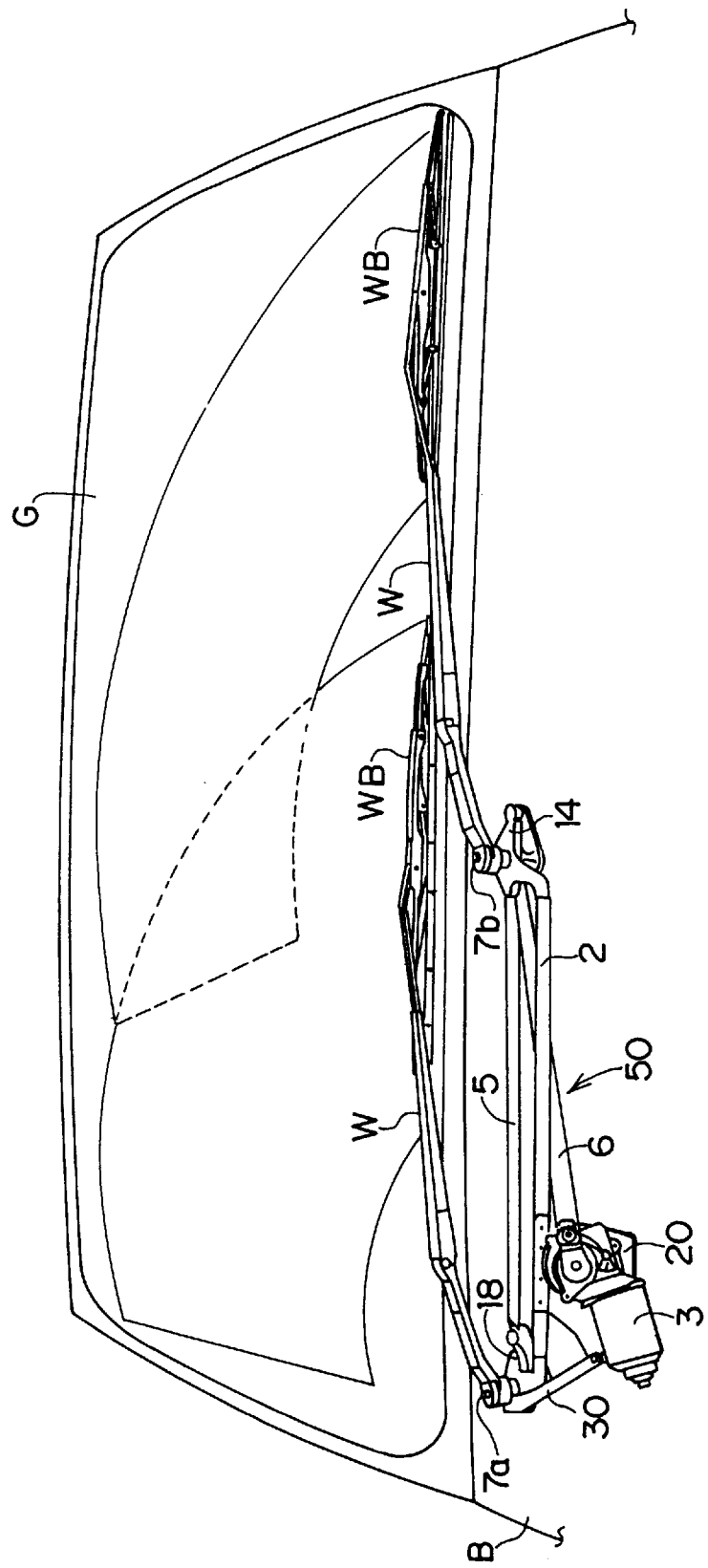
FIG. 9 is a schematic view showing a state in which a module wiper device is incorporated into a vehicle body.

Numeral 50 designates a module wiper device. Two pivot holders 1a, 1b are connected by a pipe-shaped frame 2, to which a bracket 20 is fixed by spot welding in such a manner as to be close to one pivot holder 1a. A wiper motor 3 is fastened and fixed to the bracket 20 by a bolt. Further, one end of a link rod 6 is swingably connected by a ball joint to a crank arm 32 which is fixed to an output shaft 31 of the wiper motor 3. The other end of the link rod 6 is swingably connected to a ball pin 81 of a swinging lever 8b which is fixed to a pivot shaft 7b of the separated pivot holder 1b. In addition, one end of a link rod 5 is swingably connected to the swinging lever 8b and the other end of the link rod 5 is swingably connected to a ball pin 82 of a swinging lever 8a which is fixed to a pivot shaft 7a of the adjacent pivot holder 1a. In this way, the module wiper device 50 in which the wiper motor 3 and a link mechanism are integrated is constructed. Meanwhile, a wiper arm W is fixed to the leading end of each of the pivot shafts 7a, 7b, as shown in FIG. 9.

Figure 3:
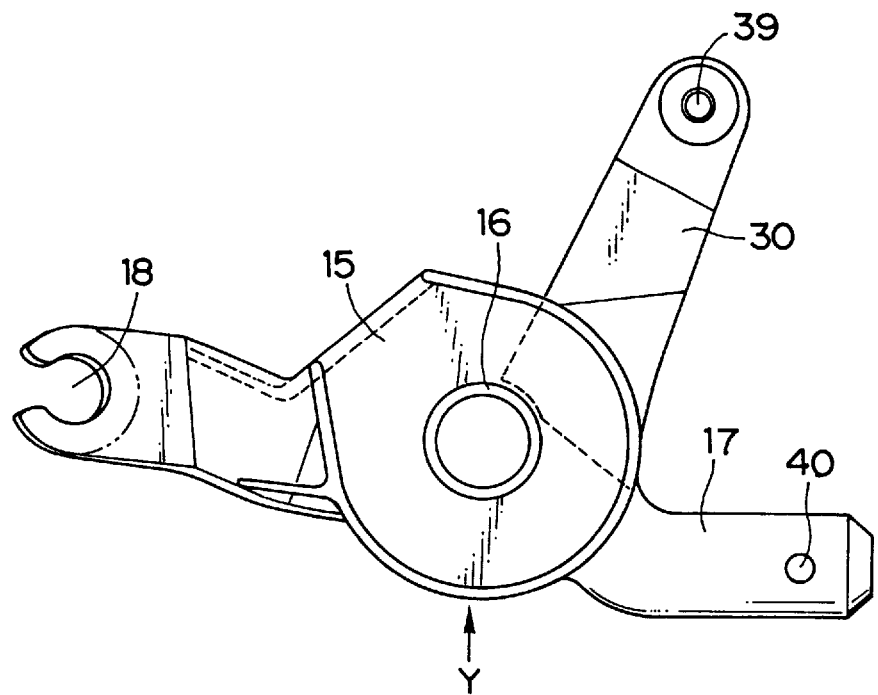
FIG. 3 is a top plan view of a pivot holder in the first embodiment.
Figure 4:
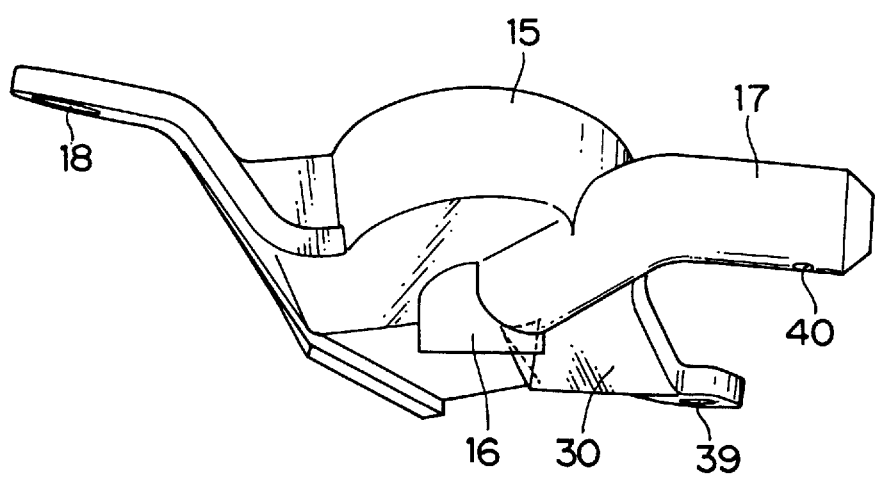
FIG. 4 is a view when seen from the direction indicated by arrow Y in FIG. 3.

In detail, the above-described module wiper device 50 is constructed as follows: in the pivot holder 1b separated from the bracket 20, a bracket portion 11 fixed to a vehicle body B (see FIG. 9), a holder portion 12 supporting the pivot shaft 7b, and a connecting portion 13 connected to the pipe-shaped frame 2 are formed integrally by aluminum die casting and a fastening hole 14 is formed in the bracket portion 11 so that the bracket portion 11 is fastened and fixed to the vehicle body B; and in the pivot holder 1a close to the bracket 20, in the same way as in the pivot shaft 1b (but the pivot holders 1a and 1b are different in shape), a bracket portion 15, a holder portion 16, a connecting portion 17, and a connecting member 30 (described later) are formed integrally by aluminum die casting (see FIGS. 3 and 4). Further, a fastening hole 18 is formed in the bracket portion 15 so that the bracket portion 15 is fastened and fixed to the vehicle body B.

The pipe-shaped frame 2 is formed linearly to have a predetermined length in correspondence to the vehicle body. The connecting portions 13, 17 of the pivot holders 1a, 1b are inserted into opening end portions of the frame 2 and the portions of the frame 2 in which the connecting portions 13, 17 are inserted are temporarily fixed from outside by caulkings 60. Thereafter, fixing holes 40 respectively formed in the connecting portions 13, 17 and through holes 41 of the frame 2 are connected and fixed by a rivet or the like so that the pivot holders 1a, 1b are connected to the frame 2.

Figure 5:
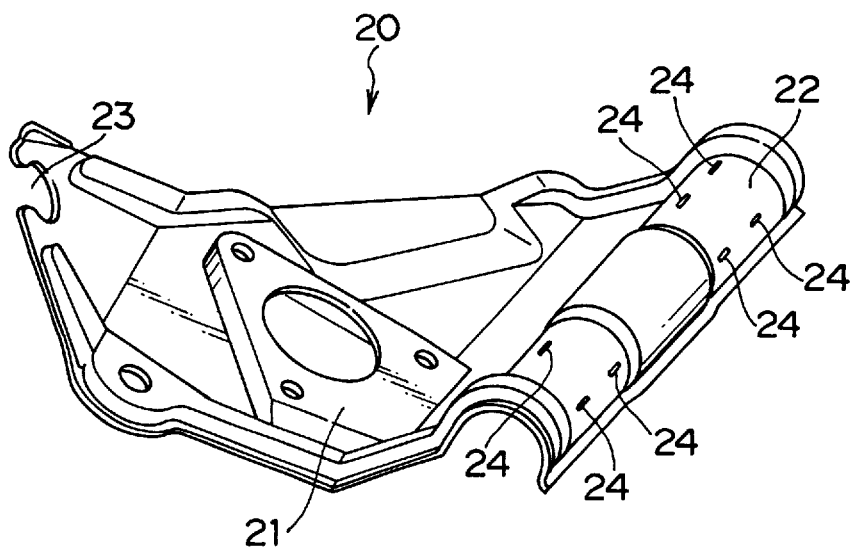
FIG. 5 is a perspective view of a bracket in the first embodiment.

The bracket 20 for mounting the wiper motor 3 is provided in the above frame 2 in such a manner as to be close to the pivot holder 1a from the standpoint of arrangement within an engine room of the vehicle. The bracket 20 is, as shown in FIG. 5, formed by press molding with a supporting portion 21 and a fixing portion 22 being integrated therewith. The supporting portion 21 is provided to fix and support the wiper motor 3 and the fixing portion 22 is fixed to the frame 2 by spot welding with an edge portion of the bracket 20 being formed to have a substantially semi-circular cross sectional configuration along an outer peripheral surface of the frame 2. Further, a fastening hole 23 used to fasten and fix the bracket 20 to the vehicle body is formed in the supporting portion 21. A plurality of projecting portions 24 each having a substantially oblong shape are formed, synchronously with the above press molding, at predetermined positions of the fixing portion 22 in such a manner as to project toward a side where the frame 2 is fixed. These projecting portions 24 are fixed to the frame 2 by spot welding.

The wiper motor 3 fixed to and supported by the above bracket 20 includes a built-in speed reducing worm mechanism. One end of the crank arm 32 is fixed to the output shaft 31 of the wiper motor 3. A ball pin 33 is provided at the other end of the crank arm 32 and is rotatably connected to a ball bearing 65 which is provided at one end of the link rod 6. Further, a ball bearing 66 is provided at the other end of the link rod 6 and a ball pin 81 of the swinging lever 8b fixed to the lower end of the pivot shaft 7b is rotatably connected to the ball bearing 66. In addition, another ball pin 83 is provided on the surface of the swinging lever 8b, which the surface is opposite to that the ball pin 81 is provided, and one end of the link rod 5 is similarly connected to the ball pin 83 by a ball bearing 56. The other end of the link rod 5 is swingably connected by a ball bearing 57 to a ball pin 82 of the swinging lever 8a which is fixed to the lower end of the pivot shaft 7a.

The pivot holder 1a disposed close to the bracket 20 includes, as described above, the bracket portion 15, the holder portion 16, the connecting portion 17, and the connecting member 30 which are formed integrally by aluminum die casting. The connecting member 30 is formed bendingly so as to be positioned at the hole 23 of the bracket 20. A fastening hole 39 is formed in the end portion of the connecting member 30 so as to be fastened and fixed to the hole 23 formed in the bracket 20 by a screw or the like.

Next, an operation of the above-described module wiper device 50 will be described.

When the wiper motor 3 fixed to and supported by the bracket 20 is driven to rotate, the crank arm 32 fixed to the output shaft 31 of the wiper motor 3 rotates and the rotation of the crank arm 32 is converted into reciprocating swinging of the swinging lever 8b via the link rod 6. Since another swinging lever 8a is connected to the swinging lever 8b via the link rod 5, the swinging lever 8a also swings reciprocatingly together with the swinging lever 8b.

When the above-described swinging levers 8a, 8b reciprocatingly swing together, the pivot shafts 7a, 7b fixed to the swinging levers 8a, 8b reciprocatingly rotates and the wiper arms W and blades WB fixed to the leading ends of the pivot shafts 7a, 7b accordingly reciprocatingly swing to wipe a glass surface.

On the other hand, frictional force is generated between the glass surface G and each of the blades WB due to the wiping operation of the wiper arms W and the frictional force acts, as reaction force of the wiper arms wiping, the frame 2 and the pivot holders 1a, 1b via the wiper arms, blades, pivot shafts 7a, 7b, swinging levers 8a, 8b, link rods 5, 6, crank arm 32, wiper motor 3, and bracket 20. Particularly, when a distance on the frame 2 between the bracket 20 and the pivot holder 1a is short, an amount by which the frame 2 bends is small and stress generated by the reaction force of the wiper arms wiping cannot be sufficiently absorbed and a crack or the like may be caused in the frame 2.

However, in the above-described first embodiment, the connecting member 30 is formed integrally with the pivot holder 1a and the fastening hole 39 formed at the end of the connecting member 30 and the hole 23 of the bracket 20 are connected by a screw or the like. For this reason, as shown in FIG. 1, a space portion A surrounded by the connecting member 30, the pivot holder 1a, the bracket 20 and the frame 2 forms a virtual bracket (indicated by slanting lines in FIG. 1). As a result, it is possible to maintain a rigidity of the same level as that in the case in which a relatively large bracket including a pivot holder is used, and thereby to obtain the module wiper device 50 having the strength in which it is possible to withstand the stress generated by the above reaction force of wiping.

A description will be hereinafter given of second, third and fourth embodiments of the present invention with reference to FIGS. 6A, 6B and 6C.

Meanwhile, since these embodiments basically have the same structure as that of the first embodiment, only different structures are illustrated and a description of the structure common to the embodiments is omitted.

[Second Embodiment]

Figure 6A:
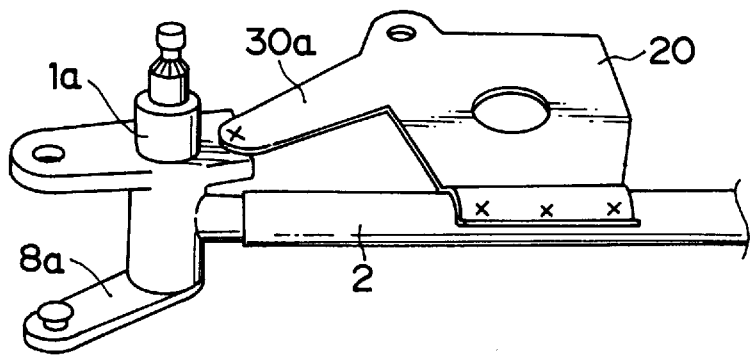
FIG. 6A is a view which illustrates a second embodiment to which the present invention is applied.

Although in the first embodiment, the connecting member 30 and the pivot holder 1a are formed integrally, in the second embodiment, a connecting member 30a may be formed integrally with the bracket 20 by press molding (see FIG. 6A).

[Third Embodiment]

Figure 6B:
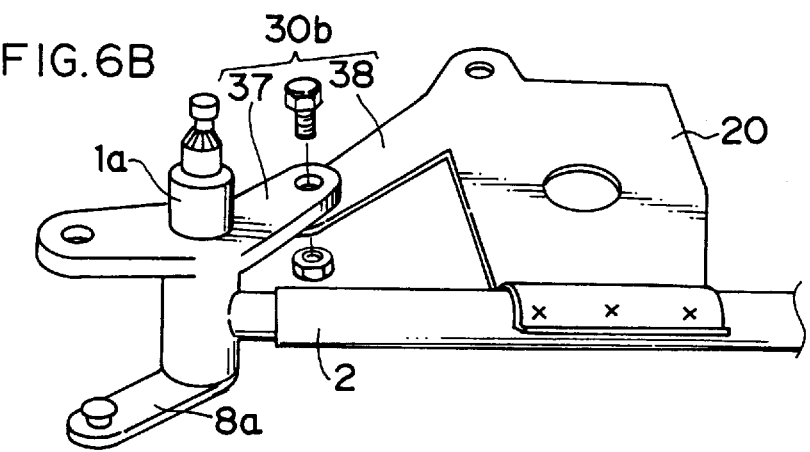
FIG. 6B is a view which illustrates a third embodiment to which the present invention is applied.

As shown in FIG. 6B, a connecting member 30b may be formed in such a manner that connecting portions 37, 38 which are respectively formed integrally with the pivot holder 1a and the bracket 20, are provided to extend toward each other and respective extending end portions thereof are connected to each other by a bolt or by welding.

[Fourth Embodiment]

Figure 6C:
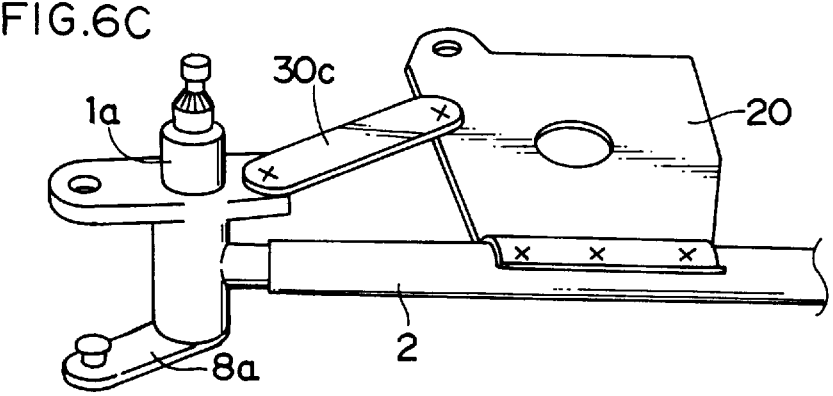
FIG. 6C is a view which illustrates a fourth embodiment to which the present invention is applied.
Figure 7:
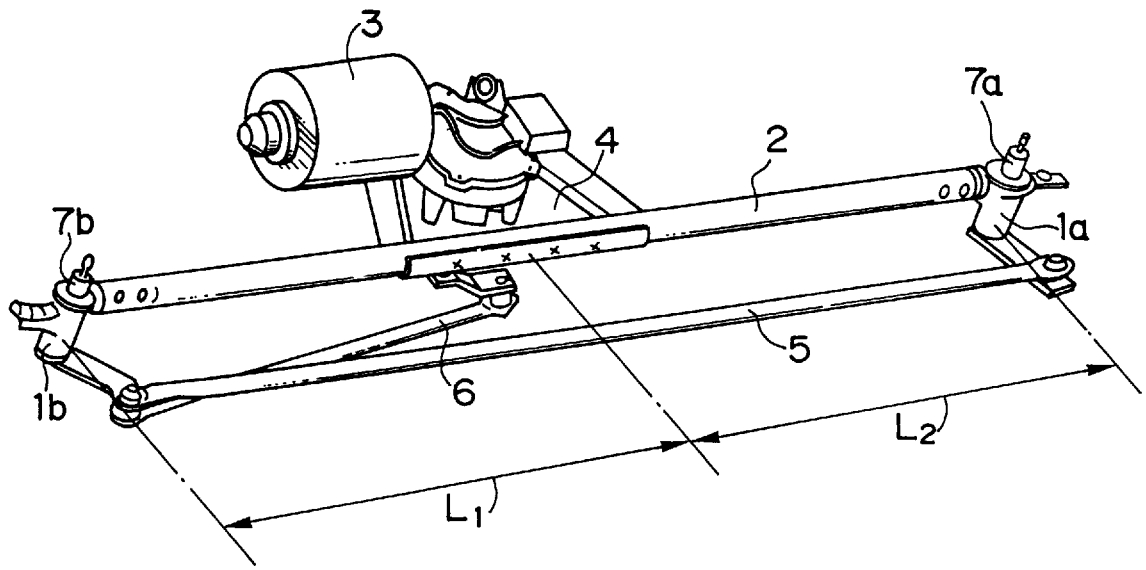
FIG. 7 is a schematic view showing a conventional module wiper device.
Figure 8:
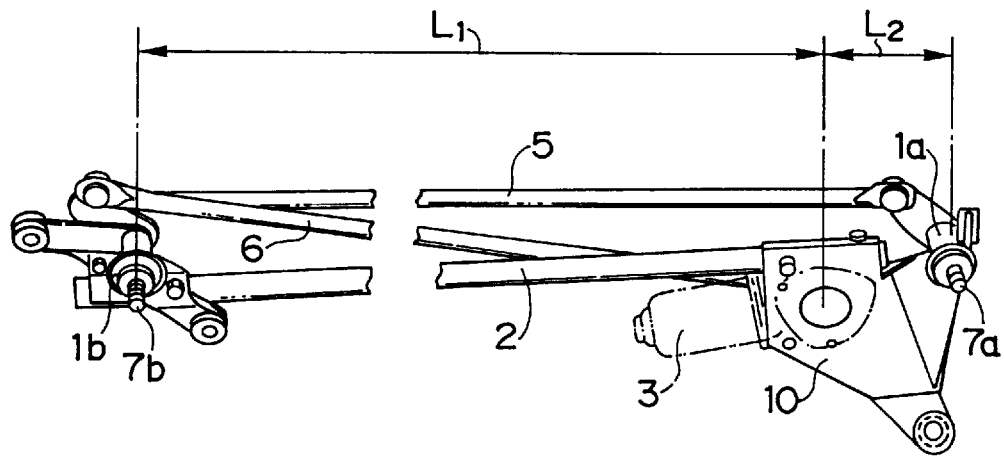
FIG. 8 is a schematic view showing another conventional module wiper device.

As shown in FIG. 6C, a connecting member 30c is formed as a separate body and the end portions thereof are connected at respective predetermined positions of the pivot holder 1a and the bracket 20 by welding or the like, with the result that the virtual bracket (indicated by slanting lines in FIG. 1) described in the first embodiment may be formed by the connecting member 30c, the bracket 20 and the frame 2.

While the embodiments of the present invention, as herein disclosed, constitute a preferred form, it is to be understood that other forms might be adopted.

What is claimed is:

1. A module wiper device comprising:
    a plurality of pivot holders adapted to be fixed to a vehicle body and rotatably supporting pivot shafts adapted to receive wiper arms;
    a frame for connecting said pivot holders;
    a bracket fixed at an intermediate portion of said frame in such a manner as to be closest to only one of said pivot holders;
    a wiper motor fixed to said bracket;
    a link rod portion which connects a swinging lever fixed to at least one of said pivot shafts to said wiper motor, converts rotating movement of said wiper motor into reciprocating movement, and transmits the reciprocating movement to the swinging lever; and
    a connecting member which connects said bracket and said one of said pivot holders to each other, so that an opening is formed between said bracket, said frame, said one of said pivot holders and said connecting member,
    wherein said bracket is connected to said one of said pivot holders through said connecting member and said frame, and wherein said bracket and another of said Divot holders are connected through only said frame.

2. A module wiper device according to claim 1, wherein said connecting member is formed integrally with said one of said pivot holders.

3. A module wiper device according to claim 1, wherein said connecting member is formed integrally with said bracket.

4. A module wiper device according to claim 1, wherein said connecting member is formed integrally with both said bracket and said one of said pivot holders.

5. A module wiper device according to claim 1, wherein said connecting member is formed as a separate body and is connected to said bracket and said one of said pivot holders.

6. A module wiper device according to claim 1, wherein said link rod portion includes a first link rod of which one end is rollingly connected to a crank arm fixed to an output shaft of said wiper motor by a ball joint and another end is rollingly connected to a ball pin of the swinging lever.

7. A module wiper device according to claim 6, wherein said link rod portion includes a second link rod of which one end is rollingly connected to the swinging lever and another end is rollingly connected to a ball pin of a second swinging lever fixed to another of said pivot shafts.

8. A module wiper device according to claim 1, wherein said pivot holders each include at least a bracket portion in which a fastening hole is formed so that at least one pivot holder is fastened and fixed to the vehicle body, a holder portion for supporting one of the pivot shafts, and a connecting portion for connecting one of the pivot holders to said frame, and said bracket portion and said holder portion and said connecting portion are formed integrally by aluminum die casting.

9. A module wiper device according to claim 8, wherein said frame has a pipe-shaped configuration and is formed linearly so as to have a predetermined length in correspondence to the vehicle body, and the connecting portions of the pivot holders are inserted in and fixed to opening end portions of said frame.

10. A module wiper device according to claim 1, wherein said bracket includes at least a supporting portion in which said wiper motor is fixed and supported, and a fixing portion fixed to said frame with an edge portion of said bracket being formed to have a substantially semi-circular cross sectional configuration along an outer peripheral surface of said frame, and the supporting portion and the fixing portion are formed integrally with each other by press working.

11. A module wiper device according to claim 10, wherein the fixing portion of said bracket is fixed to said frame by spot welding.

12. A module wiper device according to claim 10, wherein said wiper motor is fastened and fixed to the supporting portion of said bracket by a bolt.

13. A module wiper device comprising:

a plurality of pivot holders adapted to be fixed to a vehicle body and rotatably supporting pivot shafts adapted to receive wiper arms;

a frame for connecting said pivot holders;

a bracket which is fixed at an intermediate portion of said frame in such a manner as to be closest to only one of said pivot holders, and to which a wiper motor is fixed;

a link rod portion which connects at least one pivot shaft to said wiper motor, converts rotating movement of said wiper motor into reciprocating movement, and transmits the reciprocating movement to the at least one pivot shaft; and a connecting member which is formed integrally with said one of said pivot holders and connects said bracket and said one of said pivot holders to each other, so that an opening is formed between said bracket, said frame, said one of said pivot holders and said connecting member, wherein said bracket, is connected to said one of said pivot holders through said connecting member and said frame, and wherein said bracket and another of said pivot holders are connected through only said frame.

14. A module wiper device according to claim 13, wherein said pivot holders each include a bracket portion in which a fastening hole is formed so that at least one pivot holder is fastened and fixed to the vehicle body, a holder portion for supporting one of the pivot shafts, and a connecting portion for connecting one of the pivot holders to said frame, and said one of said pivot holders is constructed in that said bracket portion and said holder portion and said connecting portion are formed integrally by aluminum die casting.

15. A module wiper device according to claim 13, wherein said bracket includes a supporting portion in which said wiper motor is fixed and supported, and a fixing portion fixed to said frame with an edge portion of said bracket being formed to have a substantially semi-circular cross sectional configuration along an outer peripheral surface of said frame, and the supporting portion and the fixing portion are formed integrally with each other by press working.

16. A module wiper device according to claim 13, wherein said link rod portion includes a first link rod of which one end is rollingly connected to a crank arm fixed to an output shaft of said wiper motor by a ball joint and another end is rollingly connected to a ball pin of a swinging lever fixed to the at least one pivot shaft.

17. A module wiper device according to claim 16, wherein said link rod portion includes a second link rod of which one end is rollingly connected to the swinging lever and another end is rollingly connected to a second ball pin of a second swinging lever fixed to another of said pivot shafts.

18. A module wiper device comprising:

a plurality of pivot holders adapted to be fixed to a vehicle body and rotatably supporting pivot shafts adapted to receive wiper arms;

a frame for connecting said pivot holders;

a bracket which is fixed at an intermediate portion of said frame in such a manner as to be closest to only one of said pivot holders, and to which a wiper motor is fixed;

a link rod portion which connects at least one pivot shaft to said wiper motor, converts rotating movement of said wiper motor into reciprocating movement, and transmits the reciprocating movement to the at least one pivot shaft; and a connecting member which is formed integrally with said bracket and connects said bracket and said one of said pivot holders to each other, so that an opening is formed between said bracket, said frame, said one of said pivot holders and said connecting member, wherein said bracket is connected to said one of said pivot holders through said connecting member and said frame, and wherein said bracket and another of said pivot holders are connected through only said frame.

19. A module wiper device according to claim 18, wherein said bracket includes a supporting portion in which said wiper motor is fixed and supported, a fixing portion fixed to said frame with an edge portion of said bracket being formed to have a substantially semi-circular cross sectional configuration along an outer peripheral surface of said frame, and said connecting member, all of which are formed integrally by press working.

20. A module wiper device according to claim 18, wherein said pivot holders each include a bracket portion in which a fastening hole is formed so that at least one pivot holder is fastened and fixed to the vehicle body, a holder portion for supporting one of the pivot shafts, and a connecting portion for connecting one of the pivot holders to said frame, and said bracket portion and said holder portion and said connecting portion are formed integrally by aluminum die casting.

* * * * *